United States Patent [19]
Cho

[11] Patent Number: 6,034,955
[45] Date of Patent: Mar. 7, 2000

[54] SINGLE LINE INTERFACE SYSTEM AND METHOD THEREOF

[75] Inventor: Dong Soo Cho, Kyungki-do, Rep. of Korea

[73] Assignee: LG Semicon Co., Ltd., Chungcheongbuk-do, Rep. of Korea

[21] Appl. No.: 08/931,718

[22] Filed: Sep. 16, 1997

[30] Foreign Application Priority Data

Oct. 24, 1996 [KR]  Rep. of Korea ............. 96 48004

[51] Int. Cl.[7] .................................................. H04J 3/16
[52] U.S. Cl. ................................... 370/362; 370/458
[58] Field of Search .................................... 370/362, 364, 370/365, 438, 439, 458

[56] References Cited

U.S. PATENT DOCUMENTS

| | | | |
|---|---|---|---|
| 4,293,947 | 10/1981 | Brittain | 370/458 |
| 4,608,700 | 8/1986 | Kirtley et al. | 370/458 |
| 5,412,644 | 5/1995 | Herberie . | |
| 5,701,330 | 12/1997 | Lippmann et al. | 375/257 |
| 5,761,697 | 6/1998 | Curry et al. | 711/100 |

*Primary Examiner*—Chau Nguyen
*Assistant Examiner*—Frederic D. Wolkow

[57] ABSTRACT

A communication system and method requiring only a single line for communication among integrated circuits (ICs). The system includes: a single communication line; plural ICs coupled to the single communication line; one of the ICs operating as a master IC; one of the ICs operating as a transmitting IC and one of the ICs operating as a receiving IC according to a designation by the master IC. The master IC transmits, on the single communication line, a reference signal having a reference signal width, $C_{PW}$, to the other ICs. The master IC designates a first one of the ICs and a second one of the ICs as a chosen transmitting IC and a chosen receiving IC, respectively, for an imminent data-transmission operation, by transmitting signals of differing widths (relative to the reference signal width) over the single communication line. The ICs store the reference signal width and recognize their designation or not for the imminent data-transmission operation, respectively, by comparing the signals of differing widths against the reference signal width.

23 Claims, 7 Drawing Sheets

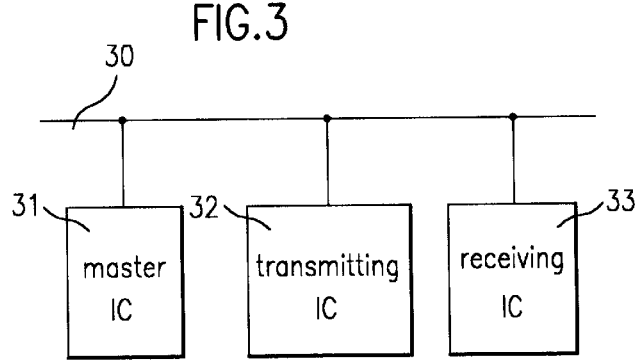
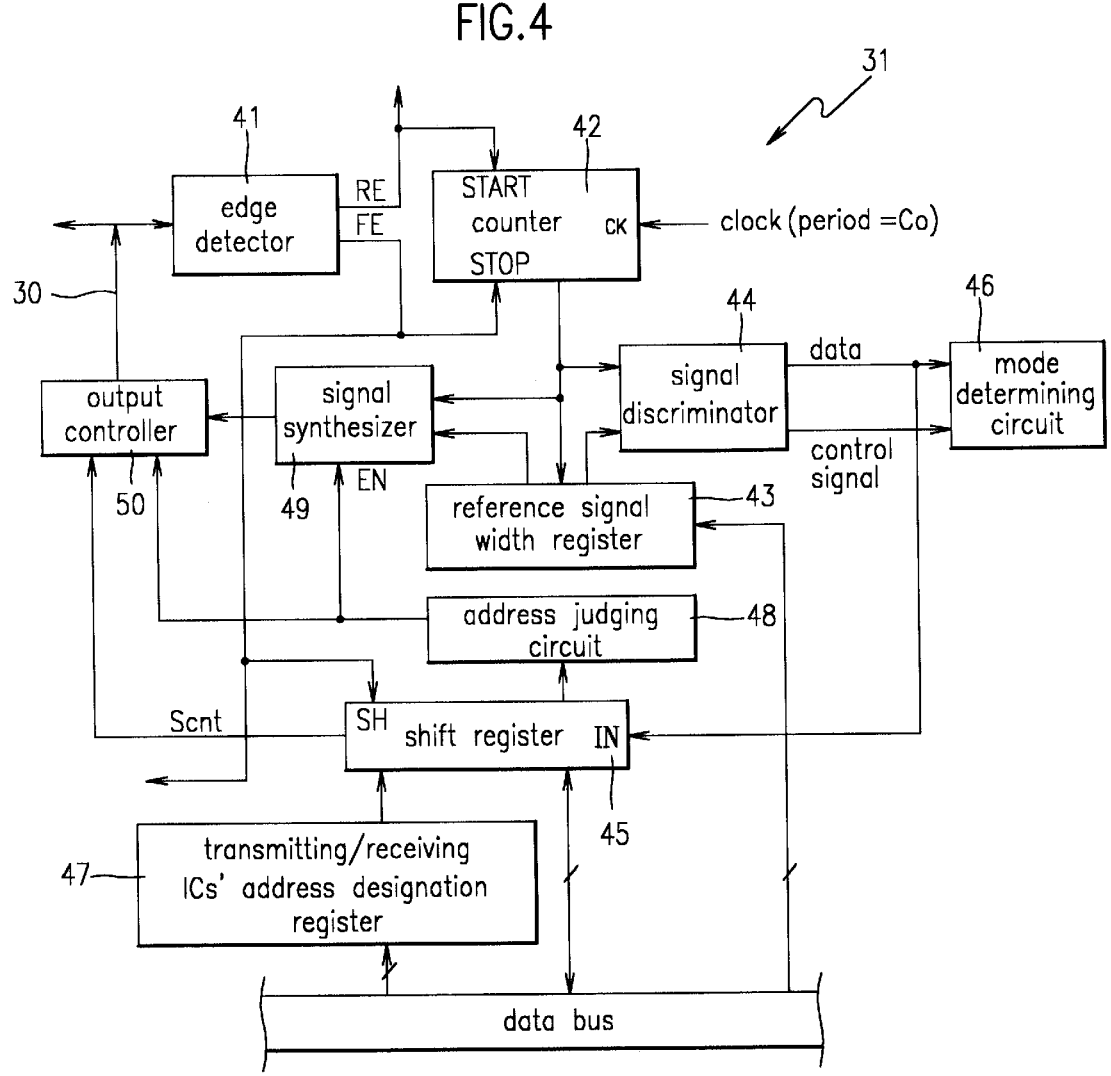

FIG.10

| | output signal | input signal discrimination | function |
|---|---|---|---|
| $C_x$ signal | reference signal width $C_{PW}$ (>4Co) | about $\frac{3}{4}C_{PW} < W$ | determine operating mode by a control signal |
| ø signal | Co | $0 < W \leq \frac{1}{4}C_{PW}$ | signal meaning 'ø' |
| 1 signal | $\frac{1}{2}C_{PW}$ | about $\frac{1}{4}C_{PW} < W \leq \frac{3}{4}C_{PW}$ | signal meaning '1' |

\* Co :: width of signal output terminal clock
 $C_{PW}$ :: reference signal width
 W :: input signal width such IC-to-IC communication systems.

SINGLE LINE INTERFACE SYSTEM AND METHOD THEREOF

BACKGROUND OF THE INVENTION

1. Field of the Invention

The present invention relates to an interface system among integrated circuits (hereinafter referred to as ICs). More particularly, this invention relates to an interface system and method thereof which requires only one signal line interconnecting the ICs, thereby simplifying the interconnection of the ICs.

2. Discussion of Related Art

Conventionally, there are two methods for a serial interface among ICs: a three-line type serial interface method which uses three bus lines for an interface among ICs; and a two-line type serial interface method using two bus lines.

Figure 1:
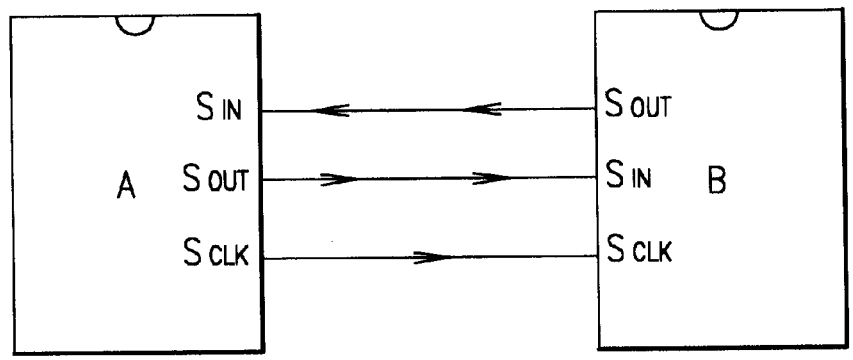
FIG. 1 is a block diagram of a conventional three-line type serial interface method.

Referring to FIG. 1, the three-line type serial interface method shows three bus lines between a master chip A and a low order chip B cascaded to the master chip A. Each integrated circuit (IC) (or chip) has an output terminal $S_{OUT}$ for outputting data, an input terminal $S_{IN}$ for inputting data where the $S_{OUT}$ of one IC is connected to the $S_{IN}$ of another IC, and a clock line $S_{CLK}$ for adjusting a synchronization to achieve serial communication.

The three-line type serial interface method adjusts synchronization to a clock signal outputted from the master IC A, and transmits data outputted from an output terminal $S_{OUT}$ of the master IC A to an input terminal $S_{IN}$ of the low order IC B, thereby achieving an interface between the two ICs.

Accordingly, a data transmission/reception operation between the master IC and the low order IC progresses simultaneously using three signal lines.

Figure 2:
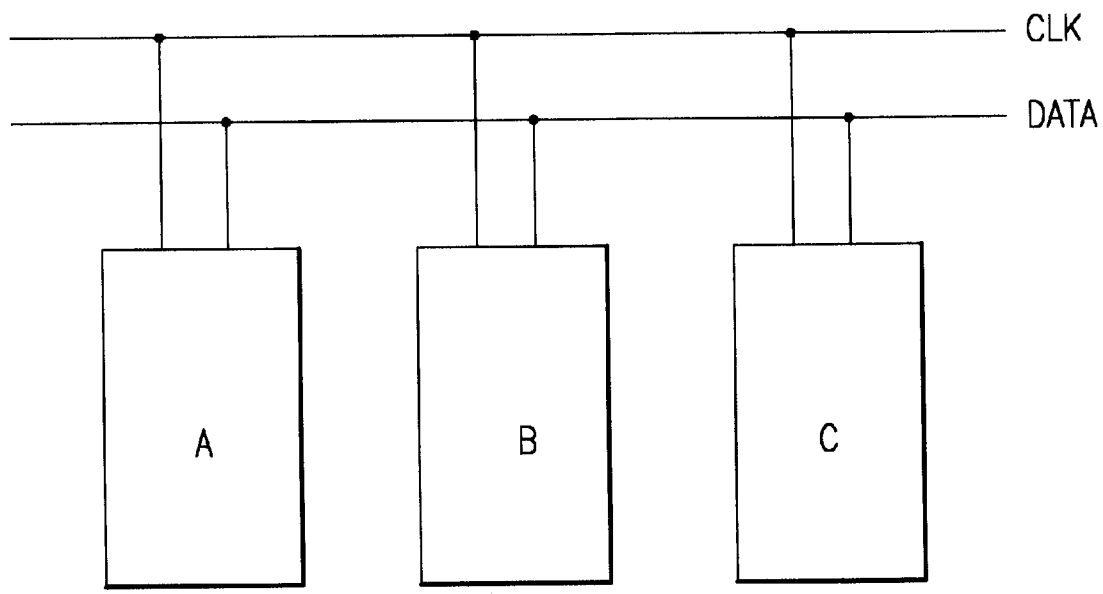
FIG. 2 is a block diagram of a conventional two-line type serial interface method.

As shown in FIG. 2, a plurality of ICs (A, B, C, . . .) are connected to two bus lines in the two-line type serial interface method. In the two-line type serial interface method, data of each IC are outputted by adjusting synchronization to a clock signal CLK outputted from a master IC.

The conventional serial interface systems have a problem, namely that they require a plurality of signal lines in order to communicate among the plurality of ICs.

SUMMARY OF THE INVENTION

Accordingly, the present invention is directed to an interface system and method thereof requiring only a single line interconnecting the integrated circuits (ICs) that obviates one or more of the problems due to the limitations and disadvantages of the conventional art.

A communication system (and method embodied therein) for communication among integrated circuits (ICs) comprising: a single communication line; a plurality of ICs coupled to said single communication line; wherein one of said ICs is operable as a master IC; wherein one of said ICs is operable as a transmitting IC according to a designation by said master IC; wherein one of said ICs is operable as a receiving IC according to a designation by said master IC; wherein said master IC is operable to transmit, on said single communication line, a reference signal having a reference signal width, $C_{PW}$, to said ICs; wherein said master IC is operable to designate a first one of said ICs and a second one of said receiving ICs as a chosen transmitting IC and a chosen receiving IC, respectively, for an imminent data-transmission operation, by transmitting a plurality of signals of differing widths relative to said reference signal width on said single communication line; wherein said ICs are operable to store said reference signal width, respectively, and are operable to recognize designation or not for said imminent data-transmission operation, respectively, by comparing said plurality of signals of said differing widths, transmittable on said single communication line, against said reference signal width; and wherein said chosen transmitting IC is operable to transmit data signals to said chosen receiving IC after completion by said master IC of said respective designations.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

Figure 5:
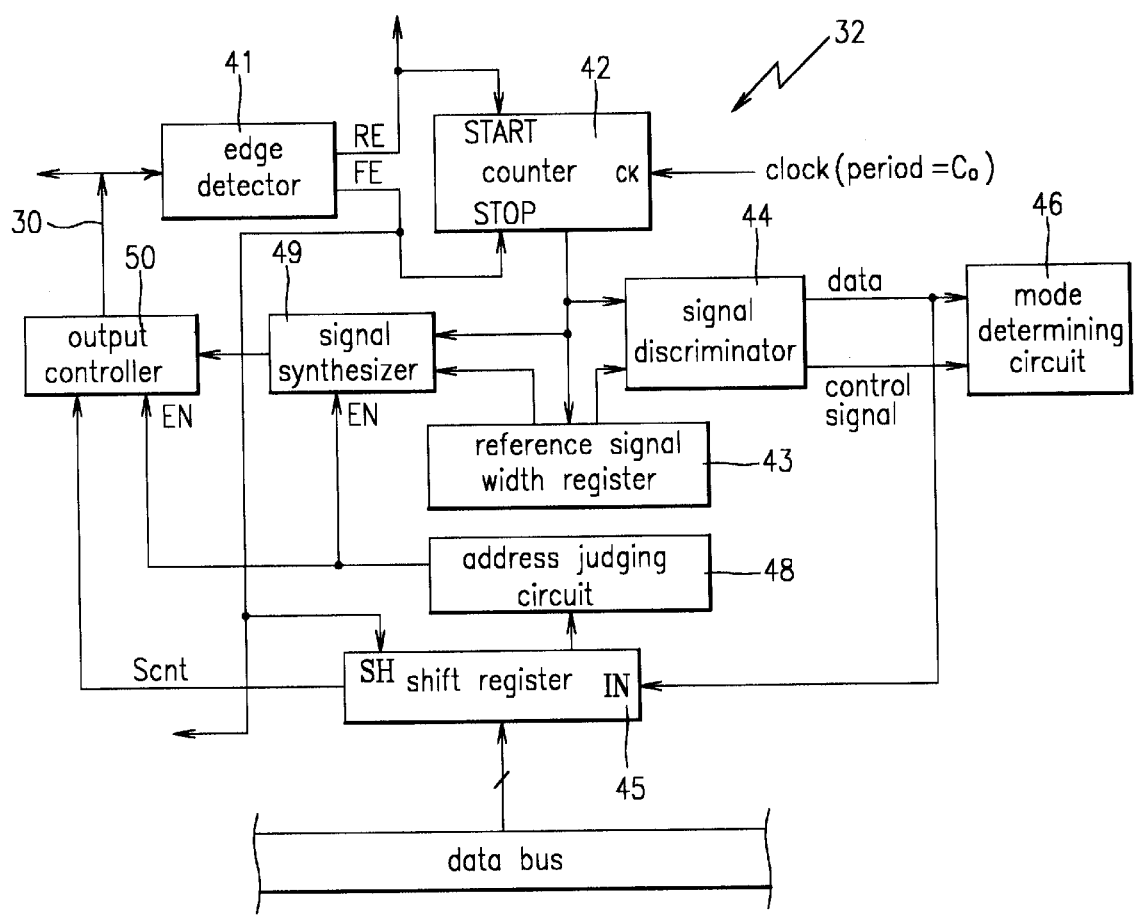
Figure 6:
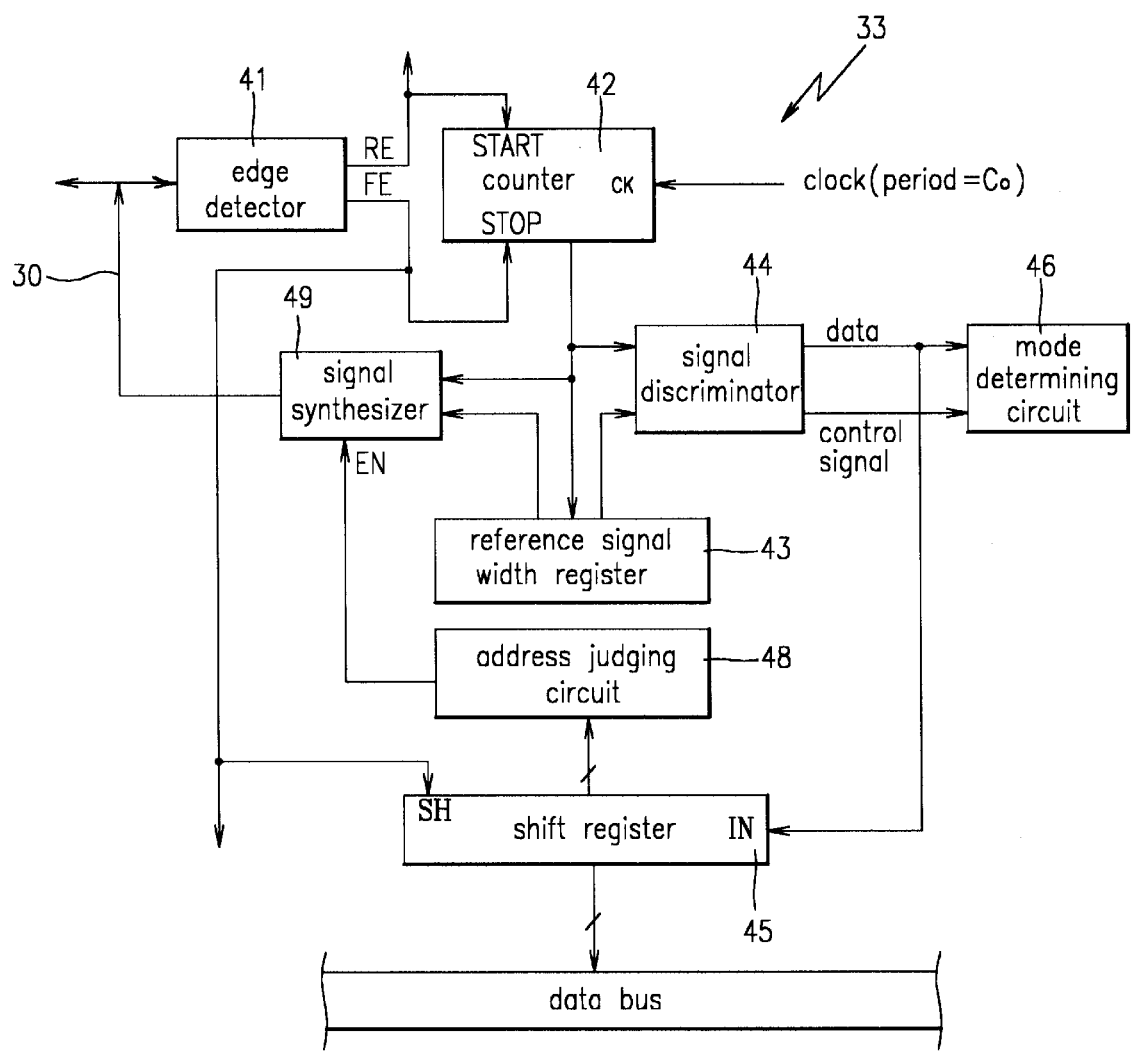
Figure 7:
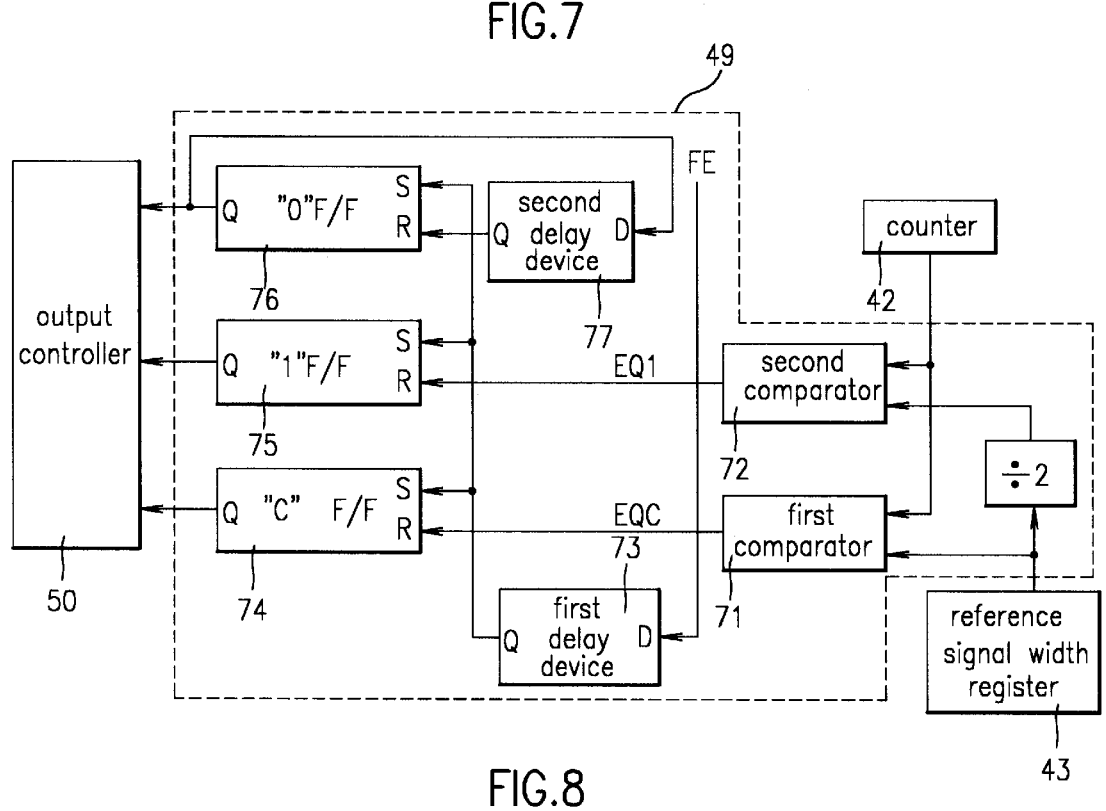
Figure 8:
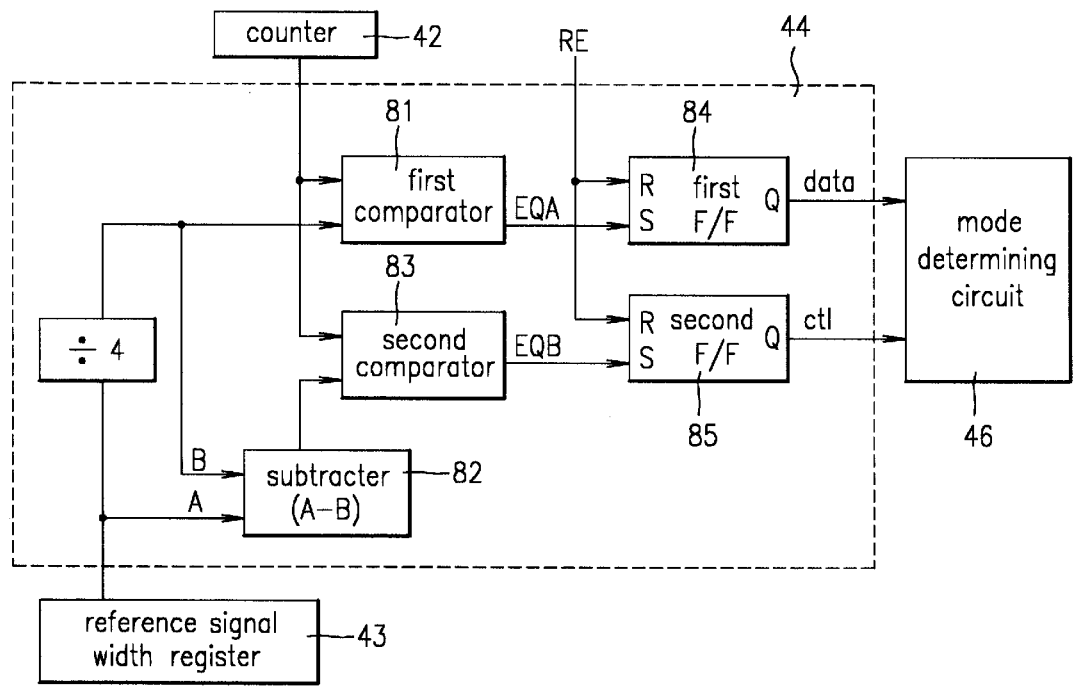
Figure 9:
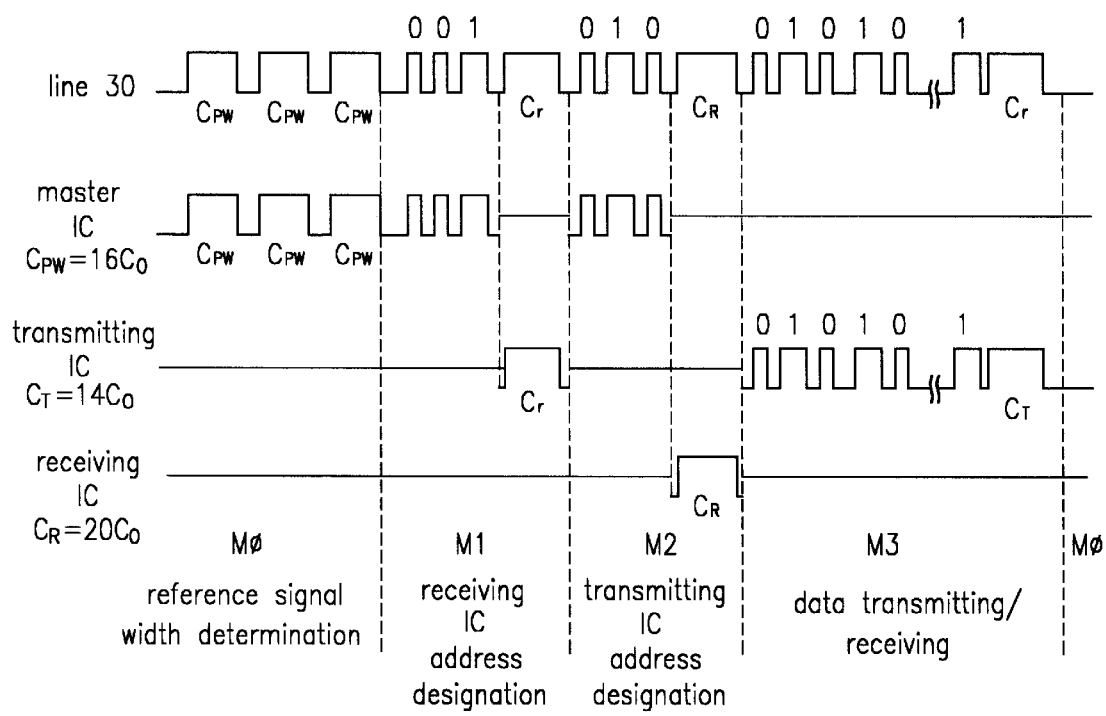

In the drawings:

FIG. 1 is a block diagram of a conventional three-line type serial interface apparatus;

FIG. 2 is a block diagram of a conventional two-line type serial interface apparatus;

FIG. 3 is a block diagram of interface system in accordance with the present invention;

FIG. 4 is an internal schematic diagram of a master IC in accordance with the present invention;

FIG. 5 is an internal schematic diagram of a transmitting IC in accordance with the present invention;

FIG. 6 is an internal schematic diagram of a receiving IC in accordance with the present invention;

FIG. 7 is a detailed schematic diagram of a signal synthesizer in accordance with the present invention;

FIG. 8 is a detailed schematic diagram of a signal discriminator in accordance with the present invention;

FIG. 9 is a signal timing diagram according to an interface method of the present invention; and FIG. 10 shows signals in accordance with the present invention.

DETAILED DESCRIPTION OF THE INVENTION

Reference will now be made in detail to the preferred embodiments of the present invention, examples of which are illustrated in the accompanying drawings.

FIG. 3 is a block diagram of an interface system in accordance with the present invention.

In FIG. 3, one signal line 30 is all that is necessary to connect together a plurality of ICs, only three of which are shown. FIG. 3 depicts an IC functioning as a master IC 31, an IC functioning as the transmitting IC 32, and an IC functioning as the receiving IC 33. The ICs that are connected to the signal line 30 can be constructed to selectively function as a master IC, a transmitting IC, or as a receiving IC. Alternatively, some of the ICs could be constructed to selectively function as transmitting IC or receiving IC, or constructed to function exclusively as either a transmitting IC or a receiving IC.

An example of a device operatively connected to a master IC would be a controller. An example of a device connected to a transmitting IC would be a sensor. An example of a device connected to a receiving device would be a motor, a solenoid, or a heater. In the event of a collision between plural master ICs trying to gain control of the line 30, the system employs well known collision avoidance techniques manifesting a predetermined hierarchy between the master ICs.

The system discriminates between a data signal and a control signal by recognizing whether the signal corresponds to the fraction of the width of a predetermined reference signal designated for a data signal or a control signal.

That is, the interface system according to the present invention includes:

a master IC 31 which generates reference signals, an address signal for designating particular ones of the pluralities of ICs, and a control signal, and loads the signals onto the signal line 30;

a transmitting IC 32 which detects a signal indicating its address through the line 30 among signals outputted from the master IC 31, and transmits a response signal (which correspond to the detected signal) and data onto the line 30; and a receiving IC 33 which detects a signal indicating its address through the line 30 among signals outputted from the master IC 31, outputs a response signal (corresponding to the detected signal) onto the line 30, and receives the data.

FIG. 4 is an internal schematic diagram of components that an IC needs to be able to function as a master IC, e.g., 31, in accordance with the present invention.

The internal schematic diagram of the master IC 31 of FIG. 4 includes:

an edge detector 41 for detecting an edge part of a signal loaded on the line 30;

a counter 42 which starts counting in accordance with the leading edge detected by the edge detector 41, and stops counting with the occurrence of a trailing edge;

a reference signal width register 43 for storing data corresponding to a width $C_{PW}$ of a reference signal;

a signal discriminator 44 which compares the width of the reference signal stored in the reference signal width register 43 with that of the signal detected by the counter 42, and discriminates whether the detected signal is a data signal or a control signal;

a shift register 45 for sequentially storing the data signal outputted from the signal discriminator 44;

a mode determining circuit 46 for determining a mode by receiving a control signal outputted from the signal discriminator 44;

an address designation register 47 for storing data relating to addresses of a transmitting IC 32 and a receiving IC;

an address judging circuit 48 which judges whether data stored in the shift register 45 is an address designating either the transmitting IC 32 or the receiving IC 33;

a signal synthesizer 49 which receives an enable signal of the address judging circuit 48, receives signals of the counter 42 and the reference signal width register 43, and thus forms a control signal, a first data signal '0', and a second data signal '1'; and an output controller 50 which sequentially selects a signal corresponding to the data signal stored in the shift register 45, among signals from the signal synthesizer 49, and outputs the signal to the line 30.

Herein, when discriminating between a data signal and a control signal, the signal discriminator 44 discriminates whether the data signal is a first datum having the value '0', or is a second datum having the value '1'.

FIG. 5 is an internal schematic diagram of the components that an IC needs to function as a transmitting IC, e.g., 32, in accordance with the present invention.

As shown in FIG. 5, the transmitting IC 32 includes:

an edge detector 41 for detecting an edge part of a signal loaded on the line 30;

a counter 42 which starts counting in accordance with the leading edge detected by the edge detector 41, and stops counting upon the occurrence of a trailing edge;

a reference signal width register 43 for storing data corresponding to a width of a reference signal;

a signal discriminator 44 which compares a signal stored in the reference signal width register 43 with the signal detected by the counter 42, and judges whether the signal loaded on the line 30 is a data signal or a control signal;

a mode determining circuit 46 for determining a current mode state by receiving a control signal outputted from the signal discriminator 44;

a shift register 45 for sequentially storing the data signal outputted from the signal discriminator 44;

an address judging circuit 48 which judges whether data stored in the shift register 45 is identical with an address designating the transmitting IC 32;

a signal synthesizer 49 which receives an enable signal of the address judging circuit 48, and makes both a response signal and a control signal by using both an output signal of the counter 42 and a signal stored in the reference signal width register 43; and an output controller 50 which selectively outputs a signal equal to the signal outputted from the shift register 45, among signals from the signal synthesizer 49, to the line 30.

When a signal loaded on the line 30 is a signal designating the transmitting IC 32, the transmitting IC 32 transmits a response signal $C_T$ to the master IC 31 through the line 30. The response signal is generated by the signal synthesizer 49 of the transmitting IC 32.

FIG. 6 is an internal schematic diagram of the components that an IC needs to function as a receiving IC, e.g., 33, in accordance with the present invention. The receiving IC 33 is similar to the internal schematic diagram of the transmitting IC 32, and does not include an output controller 50 as compared with the transmitting IC 32.

Hereinafter, a detailed configuration of the signal synthesizer 49 is as follows.

FIG. 7 is a detailed schematic diagram of a signal synthesizer in accordance with the present invention, and includes comparators, delays, and flip-flops. The signal synthesizer receives signals of the counter 42 and the reference signal width register 43, and synthesizes a control signal and a data signal by using a signal stored in the reference signal width register 43 as a standard.

The signal synthesizer 49 of FIG. 7 includes:

a first comparator 71 for comparing an output signal of the counter 42 with an output signal of the reference signal width register 43 which stores data corresponding to a width of a reference signal;

a second comparator 72 for comparing the output signal of the counter 42 with a signal equal to that of an output signal of the reference signal width register 43 divided by a predetermined period;

a first delay device 73 for delaying a trailing edge FE detected by an edge detector 41 for a predetermined time;

first, second and third flip-flops 74 to 76 for generating '0', '1' and a control signal by using an output of the first delay device 73 as an input of a set terminal; and a second delay device 77 for delaying an output of the third flip-flop 76 for a predetermined time.

Operations of the aforementioned signal synthesizer are as follows.

The signal synthesizer 49 is operated by receiving an enable signal from an address judging circuit 48 of FIGS. 4, 5 or 6, respectively.

As shown in FIG. 7, the first comparator 71 compares the output signal of the counter 42 with the output signal of the reference signal width register 43 which stores data corresponding to the width of the reference signal. If the output signal of the counter 42 is identical with the output signal of the reference signal width register, then the first comparator 71 transmits an equal-to-control ("EQC") signal to a reset terminal of a first flip-flop 74.

Then, the second comparator 72 compares the output signal of the counter 42 with a signal equal to that the output signal of the reference signal width register 43 divided by two. If the two signals are identical with each other, then the second comparator 72 transmits an equal-to-one signal EQ1 to a reset terminal of a second flip-flop 75. At this time, the first delay device 73 delays a trailing edge signal FE detected by the edge detector 41 of FIGS. 4, 5 or 6, respectively, for a predetermined time, and outputs the delayed trailing signal FE to the set terminals of the flip-flops 74, 75 and 76.

In addition, a previous output value of the third flip-flop 76 is delayed for a predetermined time by using the second delay device 77. The delayed value Q of the flip-flop 76 is output by the second delay device 77 to the reset terminal of the flip-flop 76.

By the aforementioned configuration and operation, the signal synthesizer synthesizes '0', '1' and a control signal. Further, the signal width can be differently adjusted by controlling an amount by which the trailing edge signal FE is delayed. Such signals are selectively loaded on the line 30 by the output controller 50.

FIG. 8 is a detailed schematic diagram of a signal discriminator 44 in accordance with the present invention. The signal discriminator includes comparators, a subtractor and flip-flops.

The signal discriminator includes:

a first comparator 81 for comparing an output signal of the counter 42 with a signal equal to that the output signal of the reference signal width register 43 divided by four;

a subtractor 82 which subtracts a (¼)-scaled output signal of the reference signal width register 43 from the output signal of the reference signal width register 43 to produce a (¾)-scaled reference signal corresponding to a datum of value '1';

a second comparator 83 which compares an output of the subtractor 82 with the output signal of the counter 42;

a first flip-flop 84 which receives an output of the comparator 81 at its set terminal, and receives a leading edge signal RE from the edge detection 41 of FIGS. 4–6, respectively, at a reset terminal, thereby generating a data signal indicating that the signal on line 30 under consideration was a datum; and a second flip-flop 85 which receives an output of the second comparator 83 and a leading edge signal RE from the edge detector 41 of FIGS. 4–6, respectively, at a reset terminal of the second flip-flop 85, and generates a control signal indicating the signal on line 30 under consideration was a control signal.

Operations of the aforementioned signal discriminator 44 of FIG. 8 are as follows.

The signal discriminator 44 of FIG. 8 judges whether a signal transmitted through the line 30 is a data signal (i.e., '0' and '1') or a control signal. The first comparator 81 receives signal of the counter 42 and a (¼) scaled output signal of the reference signal width register 43, and compares them. If the output signal of the counter 42 is less than or equal to the (¼)-scaled output signal of the reference signal width register 43, then a signal EQA (which is indicative that the signal under consideration corresponds to a datum value of '0') is output by the first comparator 81 to a set terminal of the first flip-flop 84.

The first flip-flop 84 inputs the next leading edge signal RE to the reset terminal, and generates a final data signal.

The output signal of the reference signal width register 43 is divided by four because a data signal that is ¼ of the width of the reference signal or less corresponds to a datum of value '0'.

In addition, the second comparator 83 receives the output signal of the counter 42 and the difference signal from the subtractor 82 (which corresponds to ¾ $C_{PW}$, the maximum value that a datum value of '1' can take) and compares whether the signal from the counter 42 is greater. If identical, then the second comparator 83 outputs an EQB signal (which is indicative that count from the counter 42 corresponds to a control/signature signal) is output to the set terminal of the second flip-flop 85. In addition, when a leading edge signal RE is inputted to its reset terminal, the second flip-flop 85 generates a control signal.

If neither the EQA nor the EQB signal is generated, then neither the "data" signal from the first flip-flop 84 nor the "ctl" signal from the second flip-flop 85 is generated. The mode determining circuit 46 recognizes this as a circumstance in which the count from the counter 42 corresponds to a logical-one datum signal.

Operations of the interface system according to the present invention will now be described with reference to the accompanying drawings.

The master IC 31 outputs a reference signal, $C_{pw}$, over the line 30, determined by the width of the value stored in the reference signal width register 43. The magnitude of $C_{pw}$ is a multiple of a basic system cycle or period, $C_o$, e.g., $C_{pw}=16$ $C_o$. Accordingly, the transmitting ICs determine a width of the reference signal on the line 30, and store the width in the reference signal width registers 43, respectively.

The master IC 31 detects a rising edge of a signal on the line 30 using the edge detector 41. Upon detection of a rising edge, the counter 42 starts counting and stops counting when a falling or trailing edge of the signal on line 30 is recognized. Therefore, the width of a signal currently loaded on the line 30 can be recognized by using the counter 42.

The signal discriminator 44 compares the output signal of the reference signal width register 43 (which stores data corresponding to the width of the reference signal) with a signal detected by the counter 42, and thus discriminates whether the current signal is a control signal or a data signal.

If the current signal is a data signal, the data signal is sequentially stored in the shift register 45. The address judging circuit 48 determines whether a signal stored in the shift register 45 is equal in size to an address designating itself. After determining the address is its own, the address judging circuit 48 outputs an enable signal to the signal synthesizer 49.

The signal synthesizer 49 receives the width of the reference signal stored in the reference signal width register 43 and the output signal of the counter 42 as an input, and makes a control signal and a data signal.

Accordingly, the output controller 50 selects a signal from the signal synthesizer 49, corresponding to data outputted from the shift register 45, and outputs the signal to line 30.

The addresses of the transmitting and receiving ICs 32 and 33 are stored in the transmitting/receiving ICs' address designation register 47, and can be temporarily held in the shift register 45.

For an imminent data-transmission operation, the master IC 31 designates/chooses one of the plurality of ICs as the transmitting IC and one as the receiving IC. For simplicity, FIG. 1 depicts only the chosen transmitting IC 32 and the chosen receiving IC 33.

To output an address designating either the transmitting IC 32 or the receiving IC 33 to the line 30, a signal corresponding to the output signal of the shift register 45 is selected from the signal synthesizer 49 under the control of the output controller 50.

The master IC 32 outputs a reference signal $C_{pw}$, e.g., equal to 16 $C_o$, a predetermined number of times, e.g., 3, through the line 30. In the MO mode, the stream of reference pulses indicates to the other ICs that a data transmission operation will begin when the stream of reference pulses ends. In other words, when the pulses change from the reference pulses to a "0" or "1", then this indicates to the other ICs that a data transmission operation is beginning. It is to be recalled that more than three ICs (as depicted in FIG. 9) are connected to the line 30. The data transmission operation will transmit the address of the IC which is to function as a transmitting IC 32 and the address for the IC which will function as a receiving IC 33.

Accordingly, if the signal loaded on the line 30 is an address signal designating the IC 32 to be the transmitting IC, then the IC 32 detects an edge of the signal on the line 30, and the counter 42 determines the width of that signal.

The signal discriminator 44 compares the signal detected by the counter 42 with the reference signal's width stored in the reference signal width register 43 and thus discriminates between a data signal and a control signal. After recognizing its own address, the IC 32 transmits its own unique control or signature signal $C_T$, e.g., $C_T=14\ C_o$.

Next, the master IC 31 will output the address of an IC that is to function as the transmitting IC 33. The signal outputted to the line 30 from the master IC 31 will be an address signal designating the receiving ICs 33. If so, the signal discriminator 44 of the transmitting IC 32 discriminates whether a current signal is an address signal designating it as the receiving IC 32.

The output signal of the signal discriminator 44 is sequentially stored in the shift register 45, and the address judging circuit 49 judges whether the signal stored in the shift register 45 is equal in size to the address signal of the transmitting IC 32.

As a result, when the unique address of the receiving IC 33 is identical with an address stored in the shift register 45, the address judging circuit 48 outputs an enable signal to the signal synthesizer 49. The signal synthesizer 49 makes each data signal and each control signal by using the enable signal.

The output controller 50 of the receiving IC 33 selects its unique control signature signal, namely the signal $C_R$, e.g., $C_R=20\ C_o$ and outputs it to the line 30. The response signal $C_R$ is indicative that a signal currently loaded on the line 30 is an address signal designating the transmitting IC 32.

To restate, the master IC 31, the transmitting IC 32 and the receiving IC 33 have unique control signals (or signature signals) that they output, namely $C_{pw}$, $C_T$ and $C_R$, respectively.

Accordingly, the master IC 31 recognizes that an IC has acknowledged its address designation as the transmitting IC 32, and then outputs an intrinsic address of the IC 33 in order to designate it as the receiving IC on the line 30.

The receiving IC 33 detects an edge of the signal loaded on the line 30, and outputs its unique control signal, namely $C_R$, to the line 30 according to the same operation procedure as the transmitting IC 32. Herein, the response signal $C_R$ is indicative that a signal currently loaded on the line 30 is an address signal designating the receiving IC 33.

When the transmitting and receiving IC 32 and 33 have been readied for transmitting/receiving by using the above operations, the transmitting IC 32 transmits data to the receiving IC 33 through the line 30.

FIG. 9 is a signal timing diagram showing an interface method of the present invention.

As shown in FIG. 9, the master IC 31 outputs a reference signal $C_{PW}$ to the line 30 during a predetermined time called a reference signal width determination state M0. Then, it outputs a signal designating an address of the transmitting IC 32 during a predetermined time known as the transmitting IC address designation state M1. During a predetermined time known as state M2, the master IC 31 outputs the transmitting IC's address. During the predetermined time known as state M3, the transmitting IC 32 outputs the data.

For example, if the intrinsic address of the transmitting IC 32 is '001', the master IC 31 outputs a signal of '001' to the line 30.

The data sequences of 101 and 111 signals have a different width as compared with the width of a sequence of three reference signals $C_{PW}$, respectively. That is, a '0' datum signal has a width of less than or equal to ¼ of the reference signal width, e.g., "O"=$C_o$, and a '1' datum signal has a width corresponding to less than or equal to ¾, but greater than ¼, of the reference signal width, e.g., "1"=8 $C_o$.

When the line 30 has the signal equal to the intrinsic address of the transmitting IC 32, the transmitting IC 32 recognizes an address of the transmitting IC 32, and outputs its unique species of control signal $C_T$ to the line 30. The master IC 31 recognizes a response signal of the transmitting IC 32 on the line 30, and outputs a signal designating an address of the receiving IC 33 to the line 30.

For example, when the unique address of the receiving IC 33 is '010', the master IC 31 is configured to cause the widths of signals corresponding to '0' and '1' to differ from each other, will sequentially output them to the line 30.

The receiving IC 33 confirms that a signal on the line 30 is an intrinsic address of the receiving IC 33, and then outputs again the response signal $C_R$ to the line 30.

In other words, FIG. 9 depicts the sequence of waveforms by which a data-transmission operation is carried out. The uppermost waveform corresponds to the signals on the line 30, while each of the other lines correspond to the signals generated by the particular IC. During the state M0, the master IC 31 outputs three of its unique control signals, $C_{PW}$, in succession. This indicates to the other ICs coupled to the line 30 that a data transmission operation is about to begin.

Next, the master IC 31 outputs the address 001 of the transmitting IC 32. The transmitting IC 32 recognizes its own address and responds with its unique identifying control signal, $C_T$. Upon recognizing the unique control/signature signal of the transmitting IC 32, the master IC 31 transmits the address of the receiving IC 33, namely 010.

Upon recognizing its unique address, the receiving IC 33 acknowledges its designation by transmitting its unique control/signature signal, $C_R$, onto the line 30. Upon recognizing another control/signature on the line 30 subsequent to the transmitting IC 32 having transmitted its own control/signature signal, the transmitting IC 32 begins the data transmission, which is terminated by the transmitting IC 32 once again transmitting its unique control/signature signal $C_T$, onto the line 30.

The data-transmission operation has four phases, M0, M1, M2 and M3. It is initiated by a sequence of control/signature signals from the master IC 31. Each of the ICs coupled to the line 30 is programmed to recognize that there will be three additional control/signature signals following the M0 state which define the data-transmission operation. Those signals correspond to an acknowledgment signal by the transmitting IC 32 during the M1 state/phase, and acknowledgment signal by the receiving IC 33 during the M2 state/phase, and a termination signal by the transmitting IC 32 during the M3 state/phase.

FIG. 10 shows the signals in accordance with the present invention, namely a 'C' signal, a '0' datum signal and '1' datum signal. The reference signal is chosen so that it is easy to produce. For example, its width, $C_{PW}$, can be equal in width to a multiple of two, e.g., four, times, the cycle or period of a basic system clock, $C_o$, i.e., $C_{PW} \geq 4 C_o$.

The 'C', signal, e.g., $C_{PW}$, $C_T$ or $C_R$, signal is a control/signature signal which determines an operating mode of a system. The 'C' signal is discriminated as a signal corresponding to greater than ¾ of the reference signal width. Each IC has a unique 'C' signal, the master IC's being $C_{PW}$, the transmitting IC's being $C_T$ and the receiving IC's being $C_R$.

A '0' datum signal is discriminated as a signal corresponding to less than ¼ of the reference signal width. Likewise, a '1' datum signal is discriminated as a signal ranging from greater than ¼ of the reference signal width to less then ¾ of the same, preferably ½ of the reference signal.

As described above, the interface system and method thereof according to the present invention requires only one communication line for communication among interconnected ICs, so that there is no need for the synchronizing lines among ICs of the conventional art. In addition, because the present invention requires only one communication line between the ICs, interconnection among the ICs is simplified, thereby facilitating a fabrication of a wiring pattern on a printed circuit board.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A communication system for communication among integrated circuits (ICs) comprising:
   a single communication line;
   a plurality of ICs coupled to said single communication line;
   wherein one of said ICs is operable as a master IC;
   wherein one of said plurality of ICs is operable as a transmitting IC according to a designation by said master IC; and
   wherein one of said plurality of ICs is operable as a receiving IC according to a designation by said master IC;
   wherein said master IC is operable to transmit, on said single communication line, a reference signal having a reference signal width, $C_{PW}$, to said ICs;
   wherein said master IC is operable to designate a first one of said ICs and a second one of said ICs as a chosen transmitting IC and a chosen receiving IC, respectively, for an imminent data-transmission operation, by transmitting a plurality of signals of differing widths relative to said reference signal width on said single communication line;
   wherein said plurality of ICs are operable to store said reference signal width, respectively, and are operable to recognize designation or not for said imminent data-transmission operation, respectively, by comparing said plurality of signals of said differing widths, transmittable on said single communication line, against said reference signal width; and
   wherein said chosen transmitting IC is operable to transmit data signals to said chosen receiving IC after completion by said master IC of said respective designations.

2. The system as in claim 1, wherein each of said transmitting IC and said receiving IC, upon designation by said master IC, respectively, is operable to acknowledge by transmitting a unique width signature signal onto said single communication line.

3. The system as in claim 1, wherein said plurality of ICs each has a unique address, and said master IC is operable to designate a first one of said ICs and a second one of said ICs as a chosen transmitting IC and a chosen receiving IC, respectively, by transmitting said unique address thereof, respectively.

4. The system as in claim 3, wherein said master IC and each of said transmitting ICs are operable to transmit a logical-zero datum and a logical-one datum, said logical-zero datum being of a different signal width a said logical-one datum.

5. The system as in claim 4, wherein said logical-zero datum is smaller in width than said logical-one datum.

6. The system as in claim 5, wherein each of said plurality of ICs is operable to transmit a unique width signature signal onto said single communication line, said signature signals being greater in width than said logical-one datum.

7. The system as in claim 6, wherein the signature signal of said transmitting IC is lesser in width than the signature signal of said master IC and the signature signal of said receiving IC is greater in width than said signature signal of said master IC.

8. The system as in claim 6, wherein said logical-zero datum has a width, $W_0$, in the range $0<W_0\leq(¼)C_{PW}$, said logical-one datum has a width, $W_1$, in the range $(¼)C_{PW}<W_1\leq(¾)C_{PW}$, and each of said signature signals has a width $W_C$ in the range $(¾)C_{PW}<W_C$.

9. The system as in claim 1, wherein said master IC and each of said plurality of transmitting ICs and receiving ICs comprise:
   a reference register operable to store data corresponding to said width $C_{PW}$ of said reference signal;
   an edge detector for detecting a leading edge and a trailing edge of a signal loaded on said single communication line;

a counter operable to start counting upon detection of a leading edge by said edge detector, and operable to stop counting upon detection of a trailing edge a trailing edge by said edge detector, and operable to determine a signal width; and a signal discriminator operable to compare an output signal of said reference register with an output signal of said counter, and operable to determine whether a signal currently loaded on said single communication line is a data signal or a control signal.

10. The system as in claim 9, wherein master IC and each of said plurality of transmitting ICs and receiving ICs comprise:

a shift register for sequentially storing signals from said single communication line determined to be data by said signal discriminator; and an address judging circuit operable to judge whether data stored in said shift register is identical with a sequence of data designating either an address of said chosen transmitting IC or an address of said chosen receiving IC.

11. The system as in claim 10, wherein said master IC and each of said plurality of transmitting ICs comprise:

a signal synthesizer operable to form one of a data signal and a control signal according to an enable signal from said address judging circuit; and an output controller operable to select a signal corresponding to data outputted from said signal synthesizer according to said enable signal from said address judging circuit, and is operable to output said selected signal to said single communication line.

12. The system as in claim 9, wherein said signal discriminator comprises:

a divider for dividing said reference width $C_{PW}$ as dividend by a predetermined value to produce a quotient;

a subtractor for subtracting said quotient from said dividend;

a first comparator for comparing an output value of said counter with said quotient;

a second comparator for comparing an output value of said counter with an output value of said subtractor;

a first flip-flop for receiving an output of said first comparator on a set terminal and a leading edge signal from said edge detector on a reset terminal, and for outputting a data signal; and a second flip-flop receives an output of said second comparator on a set terminal and a leading edge signal from said edge detector on a reset terminal, and for outputting a control signal.

13. The serial interface apparatus as set forth in claim 12, wherein said divider is operable to divide said reference width $C_{PW}$ by four.

14. The system as in claim 9, wherein said signal synthesizer comprises:

a divider for dividing said output signal of said counter by a predetermined amount to produce a divisor;

a first comparator for comparing an output signal of said counter with said width $C_{PW}$ of said reference register;

a second comparator for comparing said output signal of the counter with said divisor value;

a first delay device for delaying a trailing edge signal from said edge detector for a predetermined time;

a first flip-flop for receiving an output of said first comparator on a reset terminal and an output signal of said first delay device on a set terminal, and for outputting a control signal;

a second flip-flop for receiving an output of said second comparator on a reset terminal and an output signal of said first delay device on a set terminal, and for outputting a logical-one datum signal;

a second delay device for delaying an output of a third flip-flop for a predetermined time; and said third flip-flop for receiving an output of said first delay device on a set terminal and an output of said second delay device on a set terminal, and for outputting logical-zero datum signal.

15. The serial interface apparatus as set forth in claim 14, wherein said divider is operable to divide said reference width $C_{PW}$ by two.

16. A method of communicating between integrated circuits (ICs) coupled to a single communication line, one of said ICs being operable as a master IC, some of said ICs being operable as a transmitting IC, and some of said ICs being operable as a receiving IC, the method comprising the steps of:

causing said master IC to transmit a reference signal having a reference signal width, $C_{PW}$, to said ICs;

causing said master IC to transmit a plurality of signals of differing widths relative to said reference signal width so as to designate a first one of said ICs and a second one of said ICs as a chosen transmitting IC and a chosen receiving IC, respectively, for an imminent data-transmission operation;

causing said plurality of ICs to store said reference signal width, respectively;

causing said plurality of ICs to compare said plurality of signals of said differing widths to said reference signal width so as to recognize designation or not for said imminent data-transmission operation, respectively; and causing said chosen transmitting IC to transmit data signals to said chosen receiving IC after completion by said master IC of said respective designations.

17. The method as in claim 16, further comprising:

causing said first one and said second one of said plurality of ICs, upon designation by said master IC, respectively, to acknowledge by transmitting a unique width signature signal onto said single communication line.

18. The method as in claim 16, further comprising:

causing said master IC to transmit a unique address of said first one of said ICs and said second one of said ICs so as to designate a chosen transmitting IC and a chosen receiving IC, respectively.

19. The method as in claim 18, further comprising:

a) causing said master IC and said chosen transmitting IC to form a logical-zero datum to be a different signal width than a logical-one datum.

20. The method as in claim 19, wherein said step a) includes:

forming said logical-zero datum to be smaller in width than said logical-one datum.

21. The method as in claim 20, further comprising:

b) causing said master IC, said chosen transmitting IC and said chosen receiving IC to transmit a unique width signature signal onto said single communication line, said signature signals being greater in width than said logical-one datum.

22. The method as in claim 21, wherein said step b) includes:

forming said signature signals of said chosen transmitting IC and said chosen receiving IC to be greater in width than said signature signal of said master IC.

23. The method as in claim 21, further comprising:

causing said master IC and each of said chosen transmitting IC to form said logical-zero datum with a width, $W_0$, in the range $0 < W_0 \leq (\frac{1}{4})C_{PW}$, said logical-one datum with a width, $W_1$, in the range $(\frac{1}{4})C_{PW} < W_1 \leq (\frac{3}{4})C_{PW}$, and each of said signature signals with a width $W_C$ in the range $(\frac{3}{4})C_{PW} < W_C$.

* * * * *